(12) United States Patent
Gandhi

(10) Patent No.: US 8,991,769 B2
(45) Date of Patent: Mar. 31, 2015

(54) TWO-DIMENSIONAL MORPHING STRUCTURE FOR WING

(71) Applicant: Toyota Motor Engineering & Manufacturing North America, Inc., Erlanger, KY (US)

(72) Inventor: Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 290 days.

(21) Appl. No.: 13/751,247

(22) Filed: Jan. 28, 2013

(65) Prior Publication Data

US 2015/0047337 A1    Feb. 19, 2015

(51) Int. Cl.
*B64C 3/44*     (2006.01)
*B64C 3/52*     (2006.01)
*B64C 3/36*     (2006.01)
*B64C 3/54*     (2006.01)

(52) U.S. Cl.
CPC . *B64C 3/36* (2013.01); *B64C 3/546* (2013.01); *B64C 2003/543* (2013.01)
USPC .......................... 244/219; 244/129.1; 244/218

(58) Field of Classification Search
USPC .............. 244/99.3, 99.8, 99.11, 99.13, 129.1, 244/132, 218, 219; 428/72, 73, 116–118, 428/593; 310/328–333
See application file for complete search history.

(56) References Cited

U.S. PATENT DOCUMENTS

| | | | |
|---|---|---|---|
| 5,114,104 A | 5/1992 | Cincotta et al. | |
| 7,798,443 B2 * | 9/2010 | Hamilton et al. | ............ 244/99.8 |
| 7,901,524 B1 * | 3/2011 | McKnight et al. | ............ 148/563 |
| 7,939,178 B2 | 5/2011 | Sar et al. | |
| 8,746,626 B1 * | 6/2014 | Henry et al. | .................. 244/219 |

* cited by examiner

*Primary Examiner* — Brian M O'Hara
(74) *Attorney, Agent, or Firm* — Christopher G. Darrow; Young Basile Hanlon & MacFarlane P.C.

(57) ABSTRACT

An apparatus and methods for changing the shape of a wing using a plurality of morphing structures. One example method includes coupling a plurality of morphing structures to each other. Each morphing structure includes an anchor, a plurality of hinges, a plurality of shape-memory alloy members wherein each shape-memory alloy member extends from the anchor to a different hinge, a plurality of springs wherein each spring extends from the anchor to a different hinge, and a plurality of rigid members wherein each rigid member extends between two hinges. The method further includes actuating the plurality of shape-memory alloy members in at least some of the morphing structures wherein the shape-memory alloy members contract when actuated to pull against the hinges and anchors within the actuated morphing structures to rotate the rigid members and change the shape of the actuated morphing structure.

20 Claims, 3 Drawing Sheets

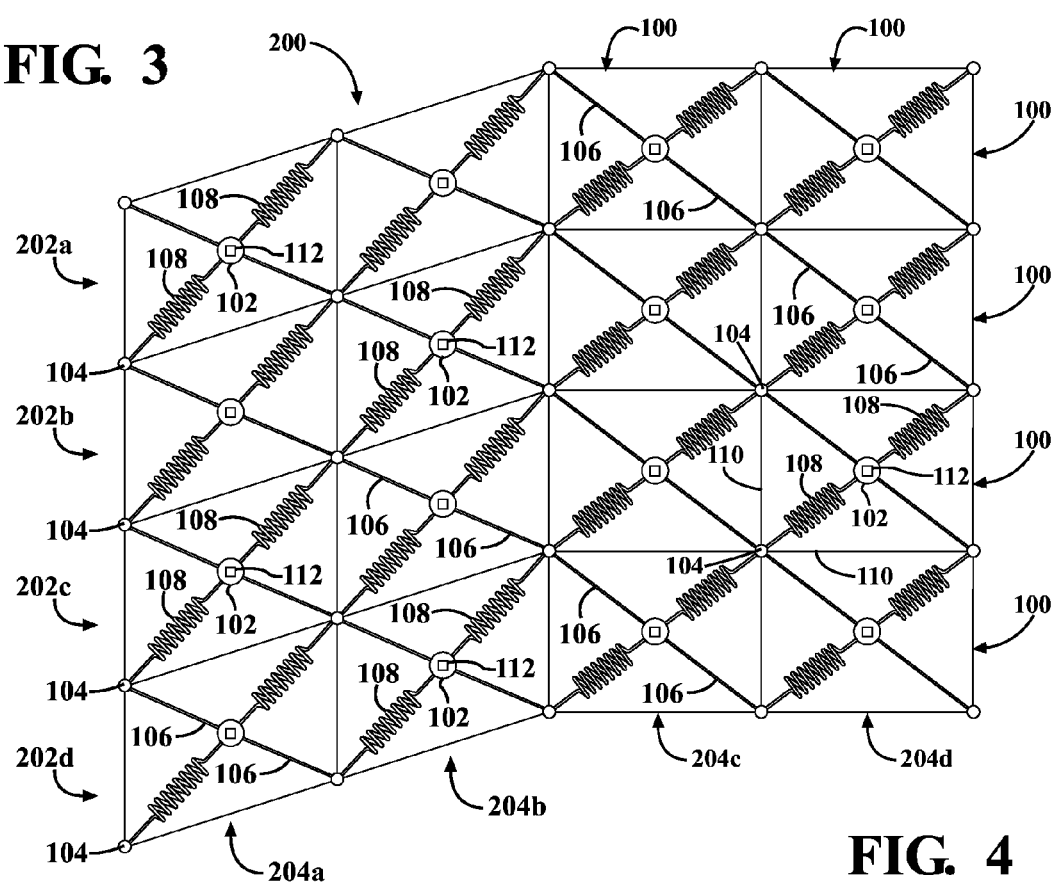
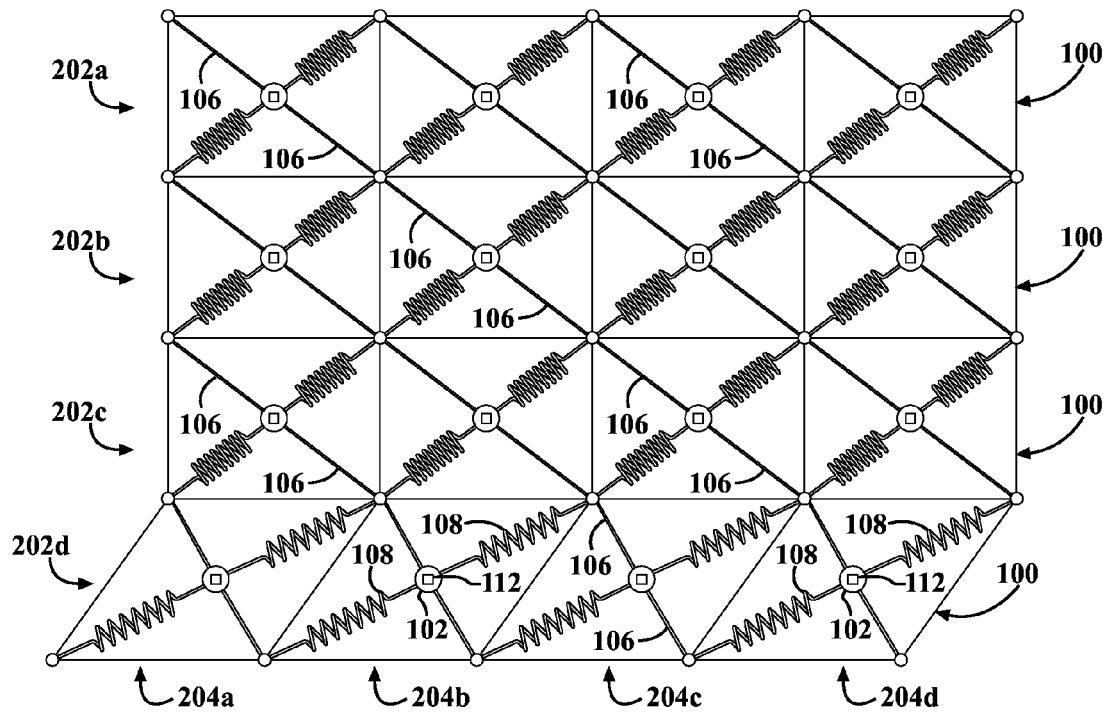

TWO-DIMENSIONAL MORPHING STRUCTURE FOR WING

BACKGROUND

The wings, stabilizers, and other aerodynamic features on an aircraft are traditionally designed with fixed shapes having specific lift and drag characteristics for an assumed set of operating conditions for the aircraft. The speed and altitude of the aircraft, maneuvers being undertaken by the aircraft, and weather and other environmental factors can greatly affect the aerodynamic efficiency and overall performance of a given shape.

Aircraft that operate in more than one type of environment or at varying speeds can benefit from a change in shape of the wing or other aerodynamic features. Some wings are designed with mechanical flaps or extensions that can be deployed when features with additional lift or drag are desirable. However, the mechanical components required to implement these features add weight and use space on the aircraft. Other wings used to improve lift and drag characteristics during specific flight conditions can include materials with only a limited amount of shape altering capability. The small changes in the shape of the wing possible with these designs are not sufficient to optimize the performance of the aircraft throughout a variety of operating environments.

SUMMARY

An apparatus and methods for changing the shape of a wing using a plurality of morphing structures.

One aspect of the disclosed embodiments is a morphing structure. The morphing structure includes an anchor, a plurality of hinges, a plurality of shape-memory alloy members wherein each shape-memory alloy member extends from the anchor to a different hinge, a plurality of springs wherein each spring extends from the anchor to a different hinge, and a plurality of rigid members wherein each rigid member extends between two hinges.

Another aspect of the disclosed embodiments is a method for constructing a morphing structure. The method includes disposing an anchor centrally between a plurality of hinges, extending a plurality of shape-memory alloy members from the anchor to some of the plurality of hinges wherein each shape-memory alloy member extends to a different hinge, extending a plurality of springs from the anchor to some of the plurality of hinges wherein each spring extends to a different hinge, and extending a plurality of rigid members between the plurality of hinges wherein each rigid member extends between two hinges.

Another aspect of the disclosed embodiments is a method for changing the shape of a wing using a plurality of morphing structures. The method includes coupling a plurality of morphing structures to each other. Each morphing structure includes an anchor, a plurality of hinges, a plurality of shape-memory alloy members wherein each shape-memory alloy member extends from the anchor to a different hinge, a plurality of springs wherein each spring extends from the anchor to a different hinge, and a plurality of rigid members wherein each rigid member extends between two hinges. The method further includes actuating the plurality of shape-memory alloy members in at least some of the morphing structures wherein the shape-memory alloy members contract when actuated to pull against the hinges and anchors within the actuated morphing structures to rotate the rigid members and change the shape of the actuated morphing structure.

BRIEF DESCRIPTION OF THE DRAWINGS

The description herein makes reference to the accompanying drawings wherein like reference numerals refer to like parts throughout the several views, and wherein:

FIG. 3 is a top view of the morphing grid of FIG. 2 with the shape-memory alloy members in the leftmost two columns of morphing structures in an actuated condition;

FIG. 4 is a top view of the morphing grid of FIG. 2 with the shape-memory alloy members in the bottommost row of morphing structures in an actuated condition.

DETAILED DESCRIPTION

A light-weight, highly flexible, load-bearing morphing grid composed of coupled morphing structures for changing the shape of a wing or other aerodynamic feature on an aircraft is described below. Each morphing structure within the morphing grid can include a central anchor, a plurality of hinges surrounding the anchor, a plurality of shape-memory alloy members and a plurality of springs each extending from the anchor to a different hinge, and a plurality of rigid members extending between the hinges, forming a rectangular shape of rigid members surrounding a crisscross shape of springs and shape-memory alloy members.

Each morphing structure can be coupled to a plurality of similar morphing structures to form the morphing grid. The morphing grid can be used to construct the internal frame of an aircraft wing. Flexible material can be used to surround the morphing grid as an outer surface of the wing. One or more rows or columns of morphing structures within the morphing grid can be actuated, and the shape-memory alloy members can contract within the actuated morphing structures, pulling against the hinges and anchors and forcing the rigid members to rotate about the hinges. The springs can counteract the forces applied to the anchors and hinges to help maintain a balanced geometric shape in each of the morphing structures as they change the shape of at least a portion of the wing.

Figure 1:
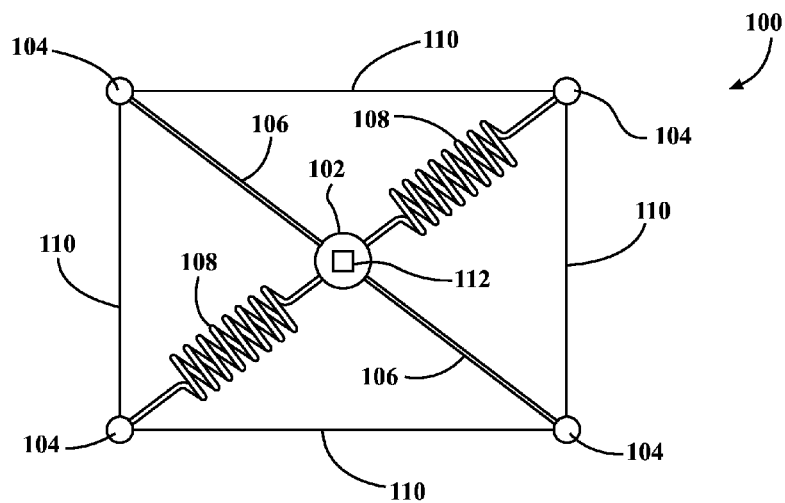
FIG. 1 is a morphing structure in accordance with one or more embodiments.

FIG. 1 is a morphing structure 100 in accordance with one or more embodiments. The morphing structure 100 includes an anchor 102 and a plurality of hinges 104. The anchor 102 is disposed centrally within the hinges 104, that is, the hinges 104 surround the anchor 102. The morphing structure 100 also includes a plurality of shape-memory alloy members 106 each extending from the anchor 102 to a different hinge 104 and a plurality of springs 108 each extending from the anchor 102 to a different hinge 104. In the example morphing structure 100 shown in FIG. 1, each hinge 104 is coupled to either a shape-memory alloy member 106 or a spring 108, but not both.

The morphing structure 100 also includes a plurality of rigid members 110. The rigid members 110 can be made of a variety of materials, e.g. steel, carbon fiber, etc., and can be designed such that no bending or twisting occurs along the body of the rigid member 110. Each rigid member 110 can extend between two hinges 104. In the example morphing structure 100 shown in FIG. 1, each hinge 104 is coupled to two rigid members 110 in addition to being coupled to either a shape-memory alloy member 106 or a spring 108.

The example morphing structure 100 in FIG. 1 is in the shape of a rectangle. Four rigid members 110 are coupled to four hinges 104 with the anchor 102 disposed centrally within the rectangular shape. Each hinge 104 can be designed to allow connection to multiple rigid members 110 as well as shape-memory alloy members 106 and springs 108. Each hinge 104 can also be designed to allow the connected rigid members 110, shape-memory alloy members 106, and springs 108 to rotate about a central axis of the hinge 104.

The anchor 102 can include a control structure 112 for actuating the plurality of shape-memory alloy members 106 extending between the anchor 102 and some of the hinges 104. Once the shape-memory alloy members 106 are actuated, for example, once the shape-memory alloy members 106 contract in length, the shape-memory alloy members 106 pull against the anchor 102 and the hinges 104 to which they are coupled, causing rotation of the rigid members 110 at the hinge 104 locations. The springs 108 can counteract the forces applied to the anchor 102 and hinges 104 to help maintain a balanced geometric shape for the morphing structure 100.

In the morphing structure 100 of FIG. 1, two shape-memory alloy members 106 extend in opposite directions from the anchor 102 each to different hinges 104. Two springs 108 also extend in opposite directions from the anchor 102 each to different hinges 104. The resulting structure is a crisscross shape of shape-memory alloy members 106 and springs 108 within the rectangular shape of four rigid members 110. Once the shape-memory alloy members 106 are actuated, contracting in length, the rigid members 110 can rotate about the central axis of each hinge 104, causing the overall shape of the morphing structure to change from a rectangle to a parallelogram.

Figure 2:
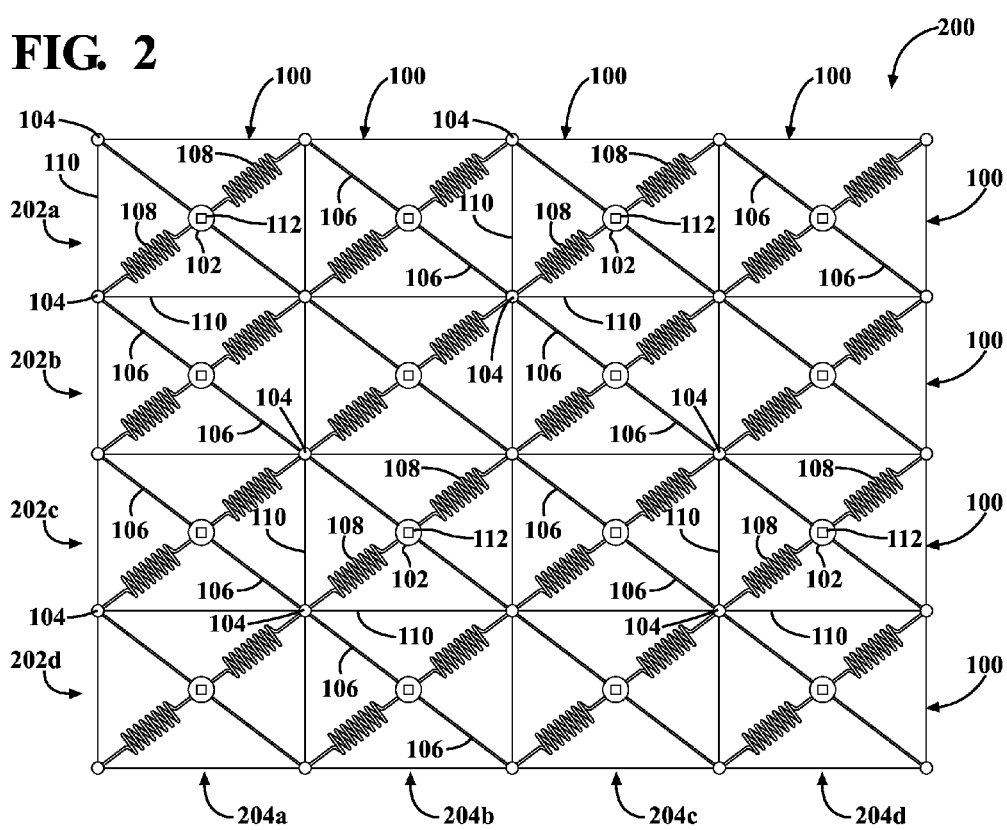
FIG. 2 is a top view of a morphing grid including a plurality of coupled morphing structures in the style of the morphing structure of FIG. 1.

FIG. 2 is a top view of a morphing grid 200 including a plurality of coupled morphing structures 100 in the style of the morphing structure 100 of FIG. 1. Each of the morphing structures 100 is constructed by disposing an anchor 102 centrally between a plurality of hinges 104 and extending a plurality of shape-memory alloy members 106 from the anchor 102 to some of the plurality of hinges 104. In the example of FIG. 2, each shape-memory alloy member 106 in a given morphing structure 100 extends from an anchor 102 within that morphing structure 100 to a different hinge 104 at the outside of the morphing structure 100.

The method of constructing each morphing structure 100 can further include extending a plurality of springs 108 from the anchor 102 to some of the plurality of hinges 104. In the example morphing grid 200 of FIG. 2, each spring 108 extends to a different hinge 104 within a given morphing structure 100. At each internal morphing structure 100 of the morphing grid 200, two shape-memory alloy members 106 can extend in opposite directions from an anchor 102 each to different hinges 104 and two springs 108 can extend in opposite directions from the same anchor 102 each to different hinges 104 to form a crisscross shape of shape-memory alloy members 106 and springs 108 within the rectangular shape of four internal rigid members 110.

The method of constructing each morphing structure 100 can further include extending a plurality of rigid members 110 between the plurality of hinges 104. In the morphing grid 200 of FIG. 2, each rigid member 110 extends between two hinges 104. The shape of the morphing grid 200 is such that each hinge 104 can be coupled to up to four rigid members 110 as well up to two shape-memory alloy members 106 and up to two springs 108. That is, the shape of the morphing grid 200 is a combination of separate, rectangular morphing structures 100 each joined at four hinges 104.

The method of constructing each morphing structure 100 can further include disposing a control structure 112 within the anchor 102 for actuating the plurality of shape-memory alloy members 106 coupled to the anchor 102. Once the control structure 112 sends a signal to actuate the shape-memory alloy members 106 coupled to a given morphing structure 100, forces are applied to the anchor 102 and the hinges 104 coupled to the shape-memory alloy members 106. As the individual morphing structures 100 are coupled together at the hinges 104 to form the morphing grid 200, each control structure 112 in either a row 202a-d or a column 204a-d of morphing structures 100 must send a signal to actuate the respective shape-memory alloy members 106 in that row 202a-d or column 204a-d in order to change the shape of at least part of the morphing grid 200.

FIG. 3 is a top view of the morphing grid 200 of FIG. 2 with the shape-memory alloy members 106 in the leftmost two columns 204a, 204b of morphing structures 100 in an actuated condition. When all morphing structures 100 in the morphing grid 200 include non-actuated shape-memory alloy members 106, the shape of each morphing structure 100 is rectangular, as in FIG. 2. To give the morphing grid 200 the partial sweep-back shape shown in FIG. 3, the shape-memory alloy members 106 in all morphing structures 100 in columns 204a and 204b can be actuated by the associated control structures 112. Once actuated, the shape-memory alloy members 106 in columns 204a and 204b shorten, rotating the associated rigid members 110 about the coupled hinges 104 and forcing the morphing structures 100 in columns 204a and 204b into parallelogram shapes.

A variety of shapes can be obtained with the morphing grid 200. The only constraint is that all morphing structures 100 in either one or more rows 202a-d or one or more columns 204a-d be actuated together. This constraint stems from the design of the morphing grid 200 in that each morphing structure 100 is itself coupled to one or more additional morphing structures 100 at the hinge 104 locations. In order to rotate rigid members 110 about two hinges 104 in a given morphing structure 100, the rigid members 110 in a coupled morphing structure 100 must also rotate about the same hinges 104.

Another example shape obtained by deformation of a portion of the morphing grid 200 is shown in FIG. 4. FIG. 4 is a top view of the morphing grid 200 of FIG. 2 with the shape-memory alloy members 106 in the bottommost row 202d of morphing structures 100 in an actuated condition. To obtain the specific shape shown in FIG. 4, the shape-memory alloy members 106 in each morphing structure 100 in row 202d are actuated using the respective control structures 112. The rigid members 110 comprising the sides of the columns 204a-d in the bottommost row 202d rotate about the hinges 104 joining row 202c and 202d, shifting the rigid members 110 at the lower edge of the bottommost row 202d to the left. Again, each control structure 112 must actuate each shape-memory alloy member 106 in the bottommost row 202d in order for the rigid members 110 at the lower edge of the bottommost row 202d to shift to the left due to the coupling of the morphing structures 100 within the morphing grid 200.

Figure 5:
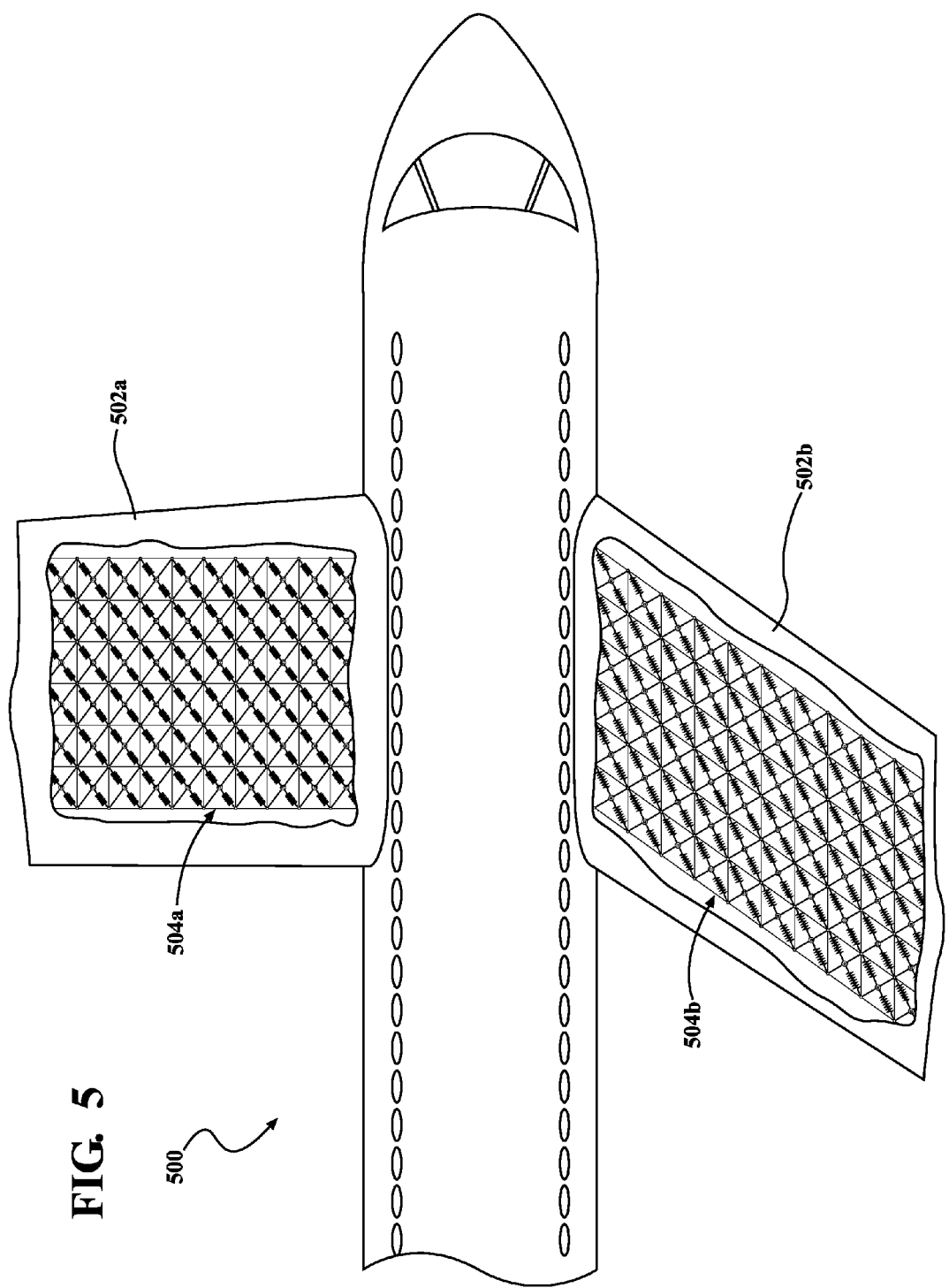
FIG. 5 is a perspective view of an aircraft having wings constructed using a morphing grid similar to the morphing grid of FIG. 2 with one wing having morphing structures in a non-actuated condition and one wing having morphing structures in an actuated condition.

FIG. 5 is a perspective view of an aircraft 500 having wings 502a-b constructed using morphing grids 504a-b similar to the morphing grid 200 of FIG. 2 with one wing 502a having morphing structures 100 in a non-actuated condition and one wing 502b having morphing structures 100 in an actuated condition. The morphing grids 504*a-b* can be covered with a flexible material to create a smooth surface for each wing 502*a-b*. The flexible material can deform with the movement of one or more rows or columns in the morphing grids 504*a-b*. In addition to the morphing grids 504*a-b*, the wings 502*a-b* can include other flexible members or supports adjacent to, coupled to, and/or surrounding the morphing grids 504*a-b* to improve the overall stiffness of the wings 502*a-b*.

One example method for changing the shape of a wing, such as the wings 502*a-b* shown in FIG. 5, can include coupling a plurality of morphing structures, such as the morphing structures 100 shown in FIGS. 1-4, to each other. This coupling creates a morphing grid, such as morphing grids 504*a-b* shown in FIG. 5. Each morphing structure 100 can include an anchor 102, a plurality of hinges 104, a plurality of shape-memory alloy members 106, a plurality of springs 108, and a plurality of rigid members 110.

The method can further include actuating a plurality of shape-memory alloy members 106 in at least some of the morphing structures 100. The shape-memory alloy members 106 can be actuated using control structures 112 within the anchors 102 of the morphing structures 100 or by any other actuation method. The shape-memory alloy members 106 can contract when actuated to pull against the hinges 104 and anchors 102 within the actuated morphing structures 100 to rotate the rigid members 110 and change the shape of the actuated morphing structure 100. Changing the shape of the actuated morphing structures 100 changes the shape of one or more columns within the morphing grids 504*a-b*, thus changing the shape of the wings 502*a-b*.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An internal frame of an aircraft wing, comprising:
   a morphing structure, the morphing structure, including:
   an anchor;
   a plurality of hinges surrounding the anchor;
   a plurality of shape-memory alloy members wherein each shape-memory alloy member extends from the anchor to one of the plurality of hinges;
   a plurality of springs wherein each spring extends from the anchor to one of the plurality of hinges; and
   a plurality of rigid members wherein each rigid member extends between two hinges.

2. The morphing structure of claim 1 wherein the anchor includes a control structure for actuating the plurality of shape-memory alloy members.

3. The morphing structure of claim 2 wherein the plurality of springs counteract the forces applied to the anchor and the plurality of hinges when one or more of the plurality of shape-memory alloy members are actuated.

4. The morphing structure of claim 1 wherein the plurality of hinges surround the anchor.

5. The morphing structure of claim 1 wherein each hinge is coupled to one of a shape-memory alloy member and a spring.

6. The morphing structure of claim 1 wherein each hinge is coupled to two rigid members and one of a shape-memory alloy member and a spring.

7. The morphing structure of claim 6 wherein four rigid members are coupled to four hinges to form a rectangular shape and the anchor is disposed centrally within the rectangular shape.

8. The morphing structure of claim 7 wherein two shape-memory alloy members extend in opposite directions from the anchor, each to different hinges, and two springs extend in opposite directions from the anchor, each to different hinges, wherein the two shape-memory alloy members and the two springs form a crisscross shape of shape-memory alloy members and springs within the rectangular shape of the four rigid members.

9. A method for constructing a morphing structure for an internal frame of an aircraft wing, comprising:
   disposing an anchor centrally between a plurality of hinges;
   extending a plurality of shape-memory alloy members from the anchor to some of the plurality of hinges wherein each shape-memory alloy member extends to one of the plurality of hinges;
   extending a plurality of springs from the anchor to some of the plurality of hinges wherein each spring extends to one of the plurality of hinges; and
   extending a plurality of rigid members between the plurality of hinges wherein each rigid member extends between two hinges;
   wherein the morphing structure forms a portion of the internal frame of the aircraft wing.

10. The method of claim 9 wherein the anchor includes a control structure for actuating the plurality of shape-memory alloy members.

11. The method of claim 10 wherein the plurality of springs counteract the forces applied to the anchor and the plurality of hinges when one or more of the plurality of shape-memory alloy members are actuated.

12. The method of claim 9 wherein each hinge is coupled to one of a shape-memory alloy member and a spring.

13. The method of claim 9 wherein each hinge is coupled to two rigid members and one of a shape-memory alloy member and a spring.

14. The method of claim 13 wherein four rigid members are coupled to four hinges to form a rectangular shape and the anchor is disposed centrally within the rectangular shape.

15. The method of claim 14 wherein two shape-memory alloy members extend in opposite directions from the anchor, each to different hinges, and two springs extend in opposite directions from the anchor, each to different hinges, wherein the two shape-memory alloy members and the two springs form a crisscross shape of shape-memory alloy members and springs within the rectangular shape of the four rigid members.

16. A method for changing the shape of a wing using a plurality of morphing structures, comprising:
   coupling a plurality of morphing structures to each other to create an internal frame for the wing, wherein each morphing structure includes:
   an anchor;
   a plurality of hinges surrounding the anchor;
   a plurality of shape-memory alloy members wherein each shape-memory alloy member extends from the anchor to one of the plurality of hinges;
   a plurality of springs wherein each spring extends from the anchor to one of the plurality of hinges; and
   a plurality of rigid members wherein each rigid member extends between two hinges; and
   actuating the plurality of shape-memory alloy members in at least some of the morphing structures wherein the shape-memory alloy members contract when actuated to pull against the hinges and anchors within the actuated morphing structures to rotate the rigid members and change the shape of the actuated morphing structures along with the shape of the wing.

17. The method of claim 16 wherein each anchor includes a control structure for actuating the plurality of shape-memory alloy members within a given morphing structure.

18. The method of claim 16 wherein the plurality of springs counteract the forces applied to the anchor and the plurality of hinges when the plurality of shape-memory alloy members are actuated within a given morphing structure.

19. The method of claim 16 wherein each hinge is coupled to one of a shape-memory alloy member and a spring within a given morphing structure.

20. The method of claim 16 wherein each hinge is coupled to two rigid members and one of a shape-memory alloy member and a spring within a given morphing structure.

* * * * *